S. T. OSMER.
Thill-Coupling.
No. 214,521. Patented April 22, 1879.
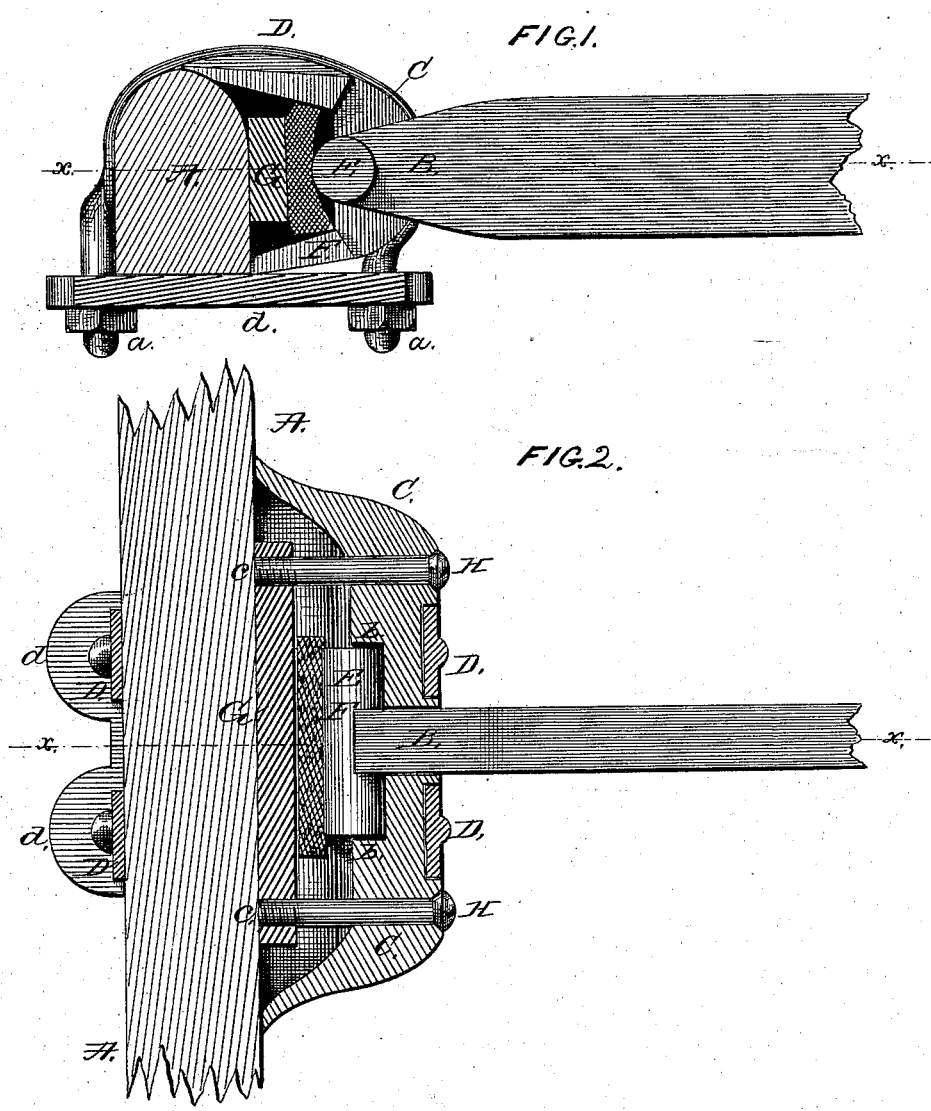

UNITED STATES PATENT OFFICE.

SYDNEY T. OSMER, OF STERLING, ILLINOIS.

IMPROVEMENT IN THILL-COUPLINGS.

Specification forming part of Letters Patent No. 214,521, dated April 22, 1879; application filed February 18, 1879.

*To all whom it may concern:*

Be it known that I, SYDNEY T. OSMER, of the city of Sterling, in the county of Whiteside and State of Illinois, have invented certain new and useful Improvements in Thill-Couplings; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improvement in thill-couplings.

Figure 1 is a sectional view of my invention. Fig. 2 is a horizontal sectional view of the same in the line $x\ x$ of Fig. 1.

A is a portion of the axle, represented for the purpose of showing the mode of attaching the thill thereto. B is the rear end of the thill having the T-shaped horizontal head E. C is a metallic cap held to and against the front of the axle A by the clips D D, which pass around both the cap and axle, and have their ends projected through the bottom plates, $d\ d$, and fastened in the usual way with the nuts $a\ a$.

The cap C is made in equal halves, one of the clips D passing around each half thereof. In the contiguous edges of the halves of the cap C is formed a recess sufficiently long to permit of the necessary vertical movement of the thill, and of a proper width to receive the thill.

The head E of the thill is countersunk at $b$ about one-half of its diameter into the inner surface of the cap. Behind the head of the thill is placed the rubber packing F, and between the packing F and the front of the axle is placed the transverse metallic follower G. From the front end of each half of the cap C the set-screws H H pass horizontally back past the ends of the packing F, and are screwed into the threaded holes $c\ c$ in the follower G. The cap C covers the packing F and followers G, and prevents the displacement of either.

The thill is attached by putting the parts over the head of the thill and fastening them to the axle with the clips, or the follower G may be placed against the axle and the cap C, containing the head of the thill, and the packing be brought against the follower and fastened by the clip.

By turning the set-screws H H the follower G draws and firmly holds the rubber F against the head E, and the latter is firmly held against the inside of the cap C, and thus any rattling of the parts is avoided.

When, by use, the head E becomes worn into the cap or rubber the latter may be tightened by drawing the follower G by means of the set-screws H H, and the rubber when worn out may be readily renewed.

The coupling can be placed at any point on the axle to adapt it to different widths of thills.

What I claim as my invention, and desire to secure by Letters Patent, is—

The cap C, follower G, set-screws H H, packing F, and clips D, in combination with the thill and axle of a vehicle, substantially as described, and for the purpose specified.

In testimony that I claim the foregoing as my own I affix my signature in presence of two witnesses.

SYDNEY T. OSMER.

Witnesses:
 C. M. WATSON,
 JOHN CARPENTER.